United States Patent
Tiwari

(10) Patent No.: US 8,681,702 B2
(45) Date of Patent: Mar. 25, 2014

(54) PLMN SELECTION METHOD AND MOBILE COMMUNICATION DEVICE UTILIZING THE SAME

(75) Inventor: Kundan Tiwari, Taoyuan County (TW)

(73) Assignee: HTC Corporation, Taoyuan (TW)

( * ) Notice: Subject to any disclaimer, the term of this patent is extended or adjusted under 35 U.S.C. 154(b) by 150 days.

(21) Appl. No.: 13/214,713

(22) Filed: Aug. 22, 2011

(65) Prior Publication Data

US 2012/0044869 A1    Feb. 23, 2012

Related U.S. Application Data

(60) Provisional application No. 61/376,002, filed on Aug. 23, 2010.

(51) Int. Cl.
*H04W 4/00* (2009.01)

(52) U.S. Cl.
USPC ............... 370/328; 455/404.1; 455/435.2

(58) Field of Classification Search
USPC ........ 370/310, 328, 329, 338, 341; 455/450, 455/451
See application file for complete search history.

(56) References Cited

U.S. PATENT DOCUMENTS

| | | | |
|---|---|---|---|
| 7,920,846 B2 | 4/2011 | Wang | |
| 2010/0075658 A1 | 3/2010 | Hou et al. | |
| 2010/0216465 A1* | 8/2010 | Mubarek et al. | 370/310 |
| 2011/0038372 A1* | 2/2011 | Wijayanathan et al. | 370/389 |

FOREIGN PATENT DOCUMENTS

| | | |
|---|---|---|
| CA | 2 694 036 A1 | 8/2010 |
| CN | 1671240 A | 9/2005 |
| CN | 101483853 A | 7/2009 |

OTHER PUBLICATIONS

3rd Generation Partnership Project; Technical Specification Group Core Network and Terminals; Non-Access-Stratum (NAS) functions related to Mobile Station (MS) in idle mode (Release 10); 3GPP TS 23.122, V10.3.0, Mar. 2011 (43 pages).
Extended European Search Report dated Dec. 14, 2011 for European Application No. 11006881.4.
3rd Generation Partnership Project; Technical Specification Group Core Network and Terminals; Characteristics of the Universal Subscriber Identity Module (USIM) application (Release 10); 3GPP TS 31.102, V10.2.0, Jun. 2011 (227 pages).
3rd Generation Partnership Project; Technical Specification Group Core Network and Terminals; IP multimedia call control protocol based on Session Initiation Protocol (SIP) and Session Description Protocol (SDP); Stage 3 (Release 11); 3GPP TS 24.229, V11.0.0, Jun. 2011 (703 pages).
3rd Generation Partnership Project; Technical Specification Group Core Network and Terminals; Mobile radio interface Layer 3 specification; Core network protocols; Stage 3 (Release 9); 3GPP TS 24.008, V9.3.0, Jun. 2010 (611 pages).

(Continued)

*Primary Examiner* — Kerri Rose
(74) *Attorney, Agent, or Firm* — Birch, Stewart, Kolasch & Birch, LLP

(57) ABSTRACT

PLMN selection methods and mobile communication devices utilizing the same are provided. The PLMN selection method is performed by a mobile communication device attached to a service network for an emergency bearer service through an emergency packet data connection, wherein the mobile communication device is capable of accessing a SIM card comprising a forbidden PLMN. The PLMN selection method comprises: receiving an equivalent PLMN list comprising the forbidden PLMN from the service network; and removing the forbidden PLMN from the equivalent PLMN list after the emergency bearer service has been completed.

20 Claims, 3 Drawing Sheets

(56) References Cited

OTHER PUBLICATIONS

3rd Generation Partnership Project; Technical Specification Group Core Network and Terminals; Mobile radio interface signalling layer 3; General aspects (Release 10); 3GPP TS 24.007, V10.0.0, Mar. 2011 (149 pages).

3rd Generation Partnership Project; Technical Specification Group Core Network and Terminals; Mobile Station (MS)—Serving GPRS Support Node (SGSN); Subnetwork Dependent Convergence Protocol (SNDCP) (Release 10); 3GPP TS 44.065, V10.0.0, Mar. 2011 (52 pages).

3rd Generation Partnership Project; Technical Specification Group Core Network and Terminals; Non-Access-Stratum (NAS) functions related to Mobile Station (MS) in idle mode (Release 9); 3GPP TS 23.122, V9.3.0, Jun. 2010 (41 pages).

3rd Generation Partnership Project; Technical Specification Group Core Network and Terminals; Non-Access-Stratum (NAS) protocol for Evolved Packet System (EPS); Stage 3 (Release 10); 3GPP TS 24.301, V10.3.0, Jun. 2011 (316 pages).

3rd Generation Partnership Project; Technical Specification Group Core Network and Terminals; Numbering, addressing and identification (Release 10); 3GPP TS 23.003, V10.2.0, Jun. 2011 (80 pages).

3rd Generation Partnership Project; Technical Specification Group Core Network and Terminals; USIM and IC card requirements (Release 10); 3GPP TS 21.111, V10.0.0, Apr. 2011 (16 pages).

3rd Generation Partnership Project; Technical Specification Group GSM/EDGE Radio Access Network; ... Mobile Station-Base Station System interface; Radio Link Control/Medium Access Control protocol (Release 10); 3GPP TS 44.060, V10.5.0, Jun. 2011 (622 pages).

3rd Generation Partnership Project; Technical Specification Group GSM/EDGE Radio Access Network; Dual Transfer Mode (DTM); Stage 2 (Release 10); 3GPP TS 43.055, V10.0.0, Mar. 2011 (49 pages).

3rd Generation Partnership Project; Technical Specification Group GSM/EDGE Radio Access Network; Functions related to Mobile Station (MS) in idle mode and group receive mode (Release 10); 3GPP TS 43.022, V10.0.0, Mar. 2011 (24 pages).

3rd Generation Partnership Project; Technical Specification Group GSM/EDGE Radio Access Network; Generic Access Network (GAN); Stage 2 (Release 10); 3GPP TS 43.318, V10.1.0, Mar. 2011 (128 pages).

3rd Generation Partnership Project; Technical Specification Group GSM/EDGE Radio Access Network; Mobile radio interface layer 3 specification; Radio Resource Control (RRC) protocol (Release 10); 3GPP TS 44.018, V10.3.0, Jun. 2011 (434 pages).

3rd Generation Partnership Project; Technical Specification Group GSM/EDGE Radio Access Network; Multiplexing and multiple access on the radio path (Release 10); 3GPP TS 45.002, V10.1.0, May 2011 (112 pages).

3rd Generation Partnership Project; Technical Specification Group GSM/EDGE Radio Access Network; Packet-switched handover for GERAN A/Gb mode; Stage 2 (Release 9); 3GPP TS 43.129, V10.0.0, Mar. 2011 (95 pages).

3rd Generation Partnership Project; Technical Specification Group GSM/EDGE Radio Access Network; Radio subsystem link control (Release 10); 3GPP TS 45.008, V10.1.0, May 2011 (151 pages).

3rd Generation Partnership Project; Technical Specification Group Radio Access Network; Radio Link Control (RLC) protocol specification (Release 10); 3GPP TS 25.322, V10.1.0, Jun. 2011 (88 pages).

3rd Generation Partnership Project; Technical Specification Group Radio Access Network; Radio Resource Control (RRC); Protocol specification (Release 10); 3GPP TS 25.331, V10.4.0, Jun. 2011 (1879 pages).

3rd Generation Partnership Project; Technical Specification Group Radio Access Network; User Equipment (UE) procedures in idle mode and procedures for cell reselection in connected mode (Release 10); 3GPP TS 25.304, V10.1.0, Jun. 2011 (52 pages).

3rd Generation Partnership Project; Technical Specification Group Services and System Aspects; 3G Security; Security architecture (Release 10); 3GPP TS 33.102, V10.0.0, Dec. 2010 (72 pages).

3rd Generation Partnership Project; Technical Specification Group Services and System Aspects; 3GPP System Architecture Evolution (SAE); Security architecture (Release 11); 3GPP TS 33.401, V11.0.1, Jun. 2011 (115 pages).

3rd Generation Partnership Project; Technical Specification Group Services and System Aspects; Architectural requirements (Release 10); 3GPP TS 23.221, V10.0.0, Mar. 2011 (48 pages).

3rd Generation Partnership Project; Technical Specification Group Services and System Aspects; Architecture enhancements for non-3GPP accesses (Release 10); 3GPP TS 23.402, V10.4.0, Jun. 2011 (231 pages).

3rd Generation Partnership Project; Technical Specification Group Services and System Aspects; Circuit Switched (CS) fallback in Evolved Packet System (EPS); Stage 2 (Release 10); 3GPP TS 23.272, V10.4.0, Jun. 2011 (78 pages).

3rd Generation Partnership Project; Technical Specification Group Services and System Aspects; General Packet Radio Service (GPRS) enhancements for Evolved Universal Terrestrial Radio Access Network (E-UTRAN) access (Release 10); 3GPP TS 23.401, V10.4.0, Jun. 2011 (281 pages).

3rd Generation Partnership Project; Technical Specification Group Services and System Aspects; General Packet Radio Service (GPRS); Service description; Stage 2 (Release 10); 3GPP TS 23.060, V10.4.0, Jun. 2011 (321 pages).

3rd Generation Partnership Project; Technical Specification Group Services and System Aspects; Multimedia Broadcast/Multicast Service (MBMS); Architecture and functional description (Release 10); 3GPP TS 23.246, V10.1.0, Jun. 2011 (122 pages).

3rd Generation Partnership Project; Technical Specification Group Services and System Aspects; Network Sharing; Architecture and functional description (Release 10); 3GPP TS 23.251, V10.2.0, Jun. 2011 (27 pages).

3rd Generation Partnership Project; Technical Specification Group Services and System Aspects; Service aspects; Service principles (Release 10); 3GPP TS 22.101, V10.6.0, Jun. 2011 (60 pages).

3rd Generation Partnership Project; Technical Specification Group Services and System Aspects; Vocabulary for 3GPP Specifications (Release 10); 3GPP TR 21.905, V10.3.0, Mar. 2011 (63 pages).

3rd Generation Partnership Project; Technical Specification Group Terminals; Subscriber Identity Modules (SIM); Functional characteristics (Release 4); 3GPP TS 42.017, V4.0.0, Mar. 2001 (12 pages).

\* cited by examiner

PLMN SELECTION METHOD AND MOBILE COMMUNICATION DEVICE UTILIZING THE SAME

CROSS REFERENCE TO RELATED APPLICATIONS

This Application claims priority of U.S. Provisional Application No. 61/376,002, filed on 23 Aug. 2010, and the entirety of which is incorporated by reference herein.

BACKGROUND OF THE INVENTION

1. Field of the Invention

The invention generally relates to mobile communication systems, and more particularly, to handling PLMN selection procedures for emergency and non-emergency services after an emergency service has been completed.

2. Description of the Related Art

In a typical mobile communication environment, a user equipment (UE) may communicate voice and/or data signals with one or more service networks via cellular stations of the service networks. The wireless communication between the UE and the service networks may be in compliance with various wireless technologies, such as the Global System for Mobile communication (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

In the above described cellular communication networks, the network selection operates by the service networks broadcasting their Public Land Mobile Network (PLMN) identities (IDs). The UEs may carry out automatic network selection based on preferences of the PLMN IDs stored in a GSM subscriber identity module (SIM) or a universal subscriber identity module (USIM). In the automatic selection mode, the PLMN is selected by the UE from a preferred PLMN list in a predetermined priority order. Typically, the UE also comprises a forbidden list, which includes a list of PLMN IDs that are not allowed for use under normal data service conditions. Conventionally, the UE may delete any PLMN ID present in the forbidden list from the preferred PLMN list before the network selection, so that the UE will not select the forbidden PLMN for normal data services. However, in the cases of emergency services, the forbidden PLMN is not removed from the preferred list, so that the UEs can choose the forbidden PLMNs for registration, leading to a problem when selecting a PLMN for non-emergency services. Therefore, a PLMN selection method for selecting a PLMN for the emergency and non-emergency services and a mobile communication utilizing the same are in need.

BRIEF SUMMARY OF THE INVENTION

In one aspect of the invention, a method for handling an equivalent PLMN list is disclosed. The method is performed by a mobile communication device having a packet data connection with a service network for an emergency bearer service and storing a forbidden PLMN identity. The method comprises steps of: receiving an equivalent PLMN list comprising the forbidden PLMN identity from the service network; and removing the forbidden PLMN identity from the equivalent PLMN list after the emergency bearer service has been completed.

In another aspect of the invention, a PLMN selection method is provided, and performed by a mobile communication device having a packet data connection with a service network for an emergency bearer service and storing a forbidden PLMN identity. The PLMN selection method comprises steps of: receiving an equivalent PLMN list comprising the forbidden PLMN identity from the service network; and being forbidden to select the forbidden PLMN identity from the equivalent PLMN list after the emergency bearer service has been completed.

In yet another aspect of the invention, a mobile communication device having a packet data connection with a service network for an emergency bearer service is revealed. The mobile communication device comprises: a memory, storing a forbidden PLMN identity; a wireless module, receiving an equivalent PLMN list from the service network; and a controller module, removing the forbidden PLMN identity from the equivalent PLMN list after the emergency bearer service has been completed.

In still another aspect of the invention, a mobile communication device having a packet data connection with a service network for an emergency bearer service is disclosed. The mobile communication device comprises: a memory, storing a forbidden PLMN identity; a wireless module, receiving an equivalent PLMN list from the service network; and a controller module, being forbidden to select the forbidden PLMN identity from the equivalent PLMN list after the emergency bearer service has been completed.

Other aspects and features of the present invention will become apparent to those with ordinarily skill in the art upon review of the following descriptions of specific embodiments of apparatuses, systems, and methods for handling the PLMN selection for the emergency and non-emergency services.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
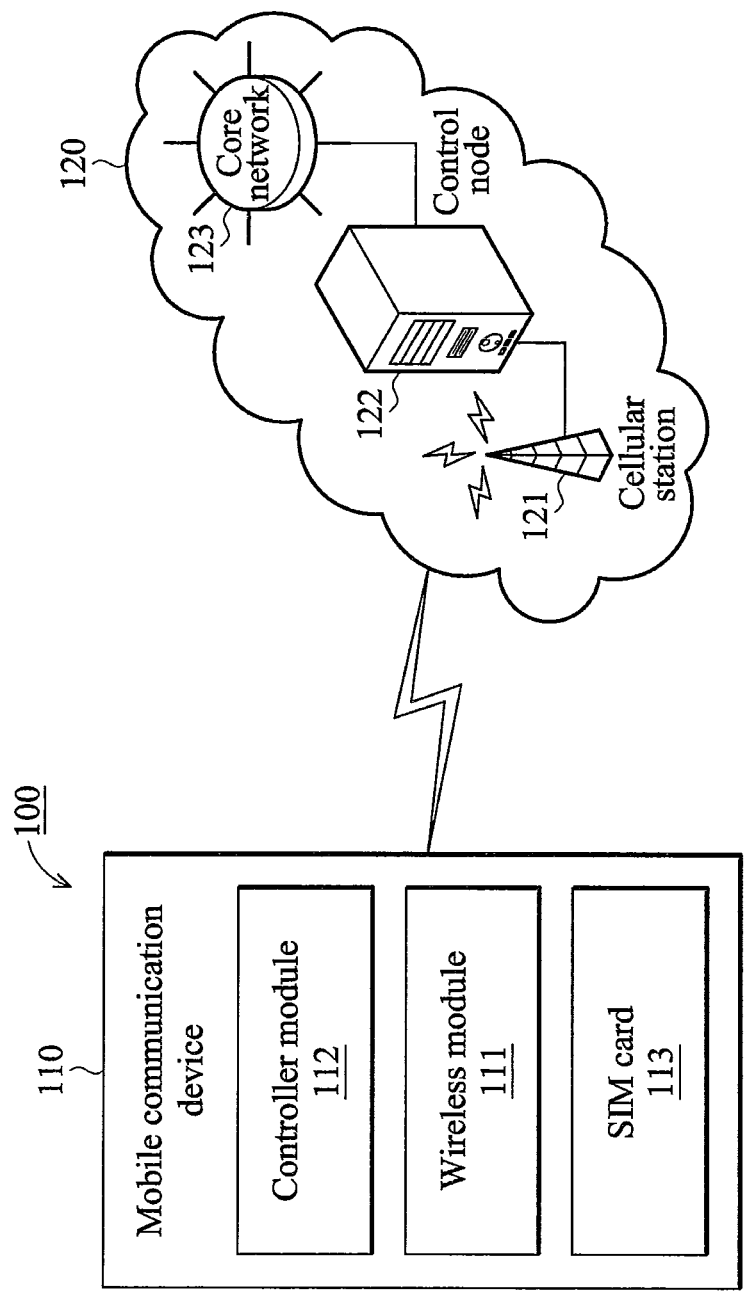
FIG. 1 is a block diagram illustrating a mobile communication environment according to an embodiment of the invention.

FIG. 1 is a block diagram illustrating a mobile communication environment according to an embodiment of the invention. In the mobile communication environment 100, the mobile communication device 110 is wirelessly connected to the service network 320 for obtaining mobile communication services. The service network 120 may comprises a General Packet Service (GPRS) network, a Universal Mobile Telecommunication System (UMTS) network, or a Long Term Evolution (LTE) network. The service network 120 comprises a cellular station 121 and a control node 122, wherein the cellular station 121 is controlled by the control node 122 to perform the functionality of wireless transceiving for the service network 120. The control node 122 is further connected to the core network 123 for interfacing with external networks, such as the Public Switched Telephone Network (PSTN), and interfacing with the Internet Protocol (IP) based Network, such as the Internet. The mobile communication device 110 is any device used directly by an end-user for communication, e.g., handhold mobile phones, laptop equipped with broadband network adaptors, or any other device capable of communication. The mobile communication device 110 comprises a wireless module 111 for performing the functionality of wireless transmissions and receptions to and from the cellular station 121. To further clarify, the wireless module 111 may comprise a baseband unit (not shown) and a radio frequency (RF) unit (not shown). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals to baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may comprise a mixer to multiply the baseband signals with a carrier oscillated in the radio frequency of the wireless communication system, wherein the radio frequency may be 900 MHz, 1900 MHz, or 2100 MHz utilized in WCDMA systems, or may be 900 MHz, 2100 MHz, or 2.6 GHz utilized in LTE systems, or others depending on the radio access technology (RAT) in use. Also, the mobile communication device 110 comprises a controller module 112 for controlling the operation of the wireless module 111 and other functional components, such as a display unit and/or keypad serving as an MMI (man-machine interface), a storage unit storing the program codes of applications or technologies, or others. In one embodiment, the service network 120 may be a WCDMA system and the mobile communication device 110 may be a UE in compliance with the TS 24.008 and TS 23.122 specification and other related specifications of the WCDMA technology. Alternatively, the mobile communication device 110 may be a UE in compliance with both of the specifications of the WCDMA or LTE technologies, and the invention is not limited thereto.

Upon entering into the mobile communication environment 100, the presence of the mobile communication device 110 is known by the service network 120 through a GPRS or PS attach procedure, where the term "GPRS attach" is used in the GPRS system and PS attach is use in the UMTS or LTE system. After the GPRS or PS attach procedure is completed, the mobile communication device 110 receives a list of PLMN IDs in an ATTACH ACCEPT message from the service network 120, which is referred to as an equivalent PLMN list. The mobile communication device 110 stores the equivalent PLMN list in a SIM card 113 or any other local memory. The PLMN is a service network composed of an access network including the cellular station 121 and the control node 122 and the core network 123. Each PLMN is uniquely identified by a PLMN ID composed of a Mobile Country Code (MCC) and Mobile Network Code (MNC), where the MCC indicates the country where the network is located, and the MNC identifies a network within a country. Each PLMN in the equivalent PLMN list is equivalent to one another with regard to PLMN selection or reselection, cell selection or reselection, and handover procedures. In some implementations, a network operator owning both a GSM and UMTS network in a same or different country could use a different PLMN code for each thereof, and each PLMN code is collected in the equivalent PLMN list for the mobile communication device 110 for access. In other implementations, a mobile network shared by several network operators for the optimization of radio coverage is also included in the equivalent PLMN list. The mobile communication device 110 can select a cell or a PLMN belonging to an equivalent network regardless of the radio access technology.

After the GPRS/PS attachment procedure, the mobile communication device 110 performs a PLMN selection to search for a PLMN from the equivalent PLMN list to acquire a data service. The mobile communication device 110 carries out the PLMN selection each time it is switched on, when recovering from a lack of coverage state, or when the mobile subscriber requests for PLMN reselection. The PLMN selection procedure can be either automatic or manual, and is compliant with the 3GPP specification TS 23.122. The mobile communication device 110 has a number of lists stored in the SIM card 113 (or any other local memory), which assists in finding a PLMN, including an equivalent PLMN list and a forbidden PLMN list. The equivalent PLMN list is a list of preferred roaming networks normally written into the SIM card by the home PLMN network operator. At the top of this list is the network on which the mobile communication device 110 was last registered, which is automatically placed at the top of the list when the mobile station registers with a foreign network. The mobile communication device 110 will always search for this PLMN as a priority, then for the HPLMN, and then for other networks on the equivalent list. The forbidden PLMN list is a list of PLMNs with which the mobile station has attempted to register with, but has been rejected possibly because no roaming agreement was in place between the home PLMN and the foreign network. The forbidden PLMN list in the SIM card 113 is not removed when the mobile communication device 110 is switched off or the SIM information is extracted. An optional extension of the forbidden PLMN list may be stored in a local memory (not shown) of the mobile communication device 110. If during the search for a PLMN for a non-emergency service the mobile communication device 110 finds a PLMN registered on the forbidden list, the mobile communication device will reject it from the PLMN selection process. During the search for a PLMN for an emergency service the mobile communication device 110 would find a PLMN from the equivalent PLMN list, regardless of the forbidden PLMN list. Both the emergency services and non-emergency services may be bearer services or teleservices, and may be a circuit switched or packet switched types of services. In some examples, the emergency service is an IMS call service and a bearer service. An IMS emergency service is indicated in the attach procedure by Attach Type "GPRS Emergency Attach". For manual mode PLMN selection, the mobile communication device 110 presents all discovered PLMNs to the subscriber, including the forbidden PLMNs. A forbidden PLMN ID will be removed from the forbidden PLMN list when registration is successful during the PLMN selection process.

Traditionally, the mobile communication device keeps the forbidden PLMN ID in the equivalent PLMN list when registering for an emergency service. Because the forbidden PLMN ID remains in the equivalent PLMN list, the mobile communication device may select the forbidden PLMN ID for a non-emergency service after the emergency service has been completed. The registration may be rejected again and the mobile communication device has to take time to search for another PLMN to camp on. Consequently the PLMN selection and registration procedure is delayed, thereby postponing the provision of the non-emergency service.

In the present invention, the mobile communication device 110 is forbidden to select a PLMN ID for a non-emergency service in the forbidden list after the emergency service has been completed. In some implementations, the mobile communication device 110 removes the forbidden PLMN ID from the equivalent PLMN list upon completion of the emergency service. In other implementations, the communication device 110 removes the forbidden PLMN ID from the equivalent PLMN list prior to switching off the device. In still other implementations, the communication device 110 removes the forbidden PLMN ID from the equivalent PLMN list when the device is switched on. In yet other implementations, the communication device 110 selects a PLMN ID from the equivalent PLMN list other than those in the forbidden PLMN list after the emergency service is finished. The PLMN selection procedures according to the invention are detailed in FIG. 2 and FIG. 3.

Figure 2:
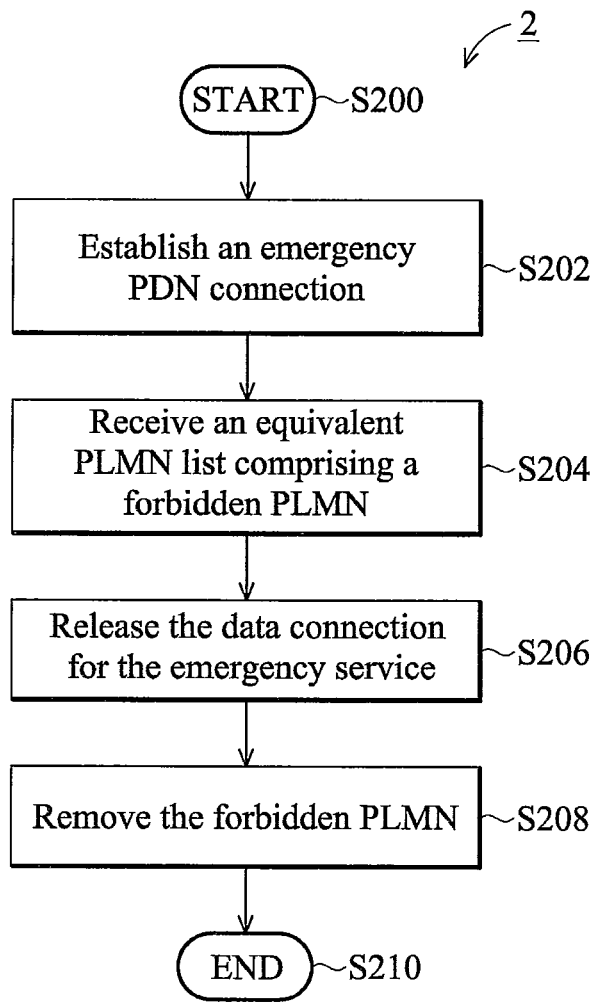
FIG. 2 is a flowchart of an exemplary PLMN selection method 2 according to the invention.

FIG. 2 is a flowchart of an exemplary PLMN selection method 2 according to the invention, incorporating the mobile communication device 110 in FIG. 1.

Upon startup, the mobile communication device 110 is attached to the service network 120 (S200), and select a PLMN to establishes an emergency PDN connection (S202). If the PLMN registration is successful, the controller module 112 carries out a PDP/PDN context activation procedure to establish an emergency packet data connection between the mobile communication device 110 and the service network 120 and receives the emergency IMS call service. The mobile communication device 110 receives an equivalent PLMN list from the service network 120 either in an ATTACH ACCEPT message or a ROUTING AREA UPDATE ACCEPT message (S204). The ATTACH ACCEPT message is received in a GPRS/PS attach procedure and the ROUTING AREA UPDATE ACCEPT message is received in a routing area update procedure to signal completion of the procedure. The GPRS/PS attach procedure occurs when the mobile communication device requests for a packet based data service, including non-emergency and emergency types. The Attach type is labeled "GPRS Emergency Attach" to indicate an emergency packet based attach request. The routing area update procedure takes place when the GPRS/PS attached mobile communication device detects that it has entered a new routing area and wishes to inform the service network 120 of the new location. In the case of an emergency IMS call, when the service network 120 returns the ATTACH ACCEPT message or the ROUTING AREA UPDATE ACCEPT message with the equivalent PLMN list that comprises one or more members of the forbidden PLMN list, the controller module 112 keeps the forbidden PLMN ID in the list for the PLMN selection. Once the emergency service has been completed, the controller module releases the emergency packet data connection by deactivating the local PDP/PDN context associated with the emergency call service, and the wireless module 111 initiates the PDP/PDN context deactivation procedure by sending a deactivation request message to the service network 5120, thereby releasing the emergency packet data connection for the emergency service at both ends (S206). After the emergency service has been completed and the emergency data connection has been released, the controller module 112 removes the forbidden PLMN ID from the equivalent list (S208), so that the forbidden PLMN will no longer be chosen for the next packet data service, thereby completing the PLMN selection method 2. In some implementations, the controller module 112 deletes the forbidden PLMN ID right after the completion of the emergency service. In other implementations, the communication device 110 removes the forbidden PLMN ID during the switch-off procedure. In yet other implementations, the communication device 110 removes the forbidden PLMN ID during the switch-on stage.

The present invention offers a PLMN selection method for a mobile communication device that removes forbidden PLMN IDs from the equivalent list after the emergency service has been completed, preventing the mobile communication device to request for an invalid PLMN registration, thereby increasing the selection efficiency and decreasing the delay for providing communication services.

Figure 3:
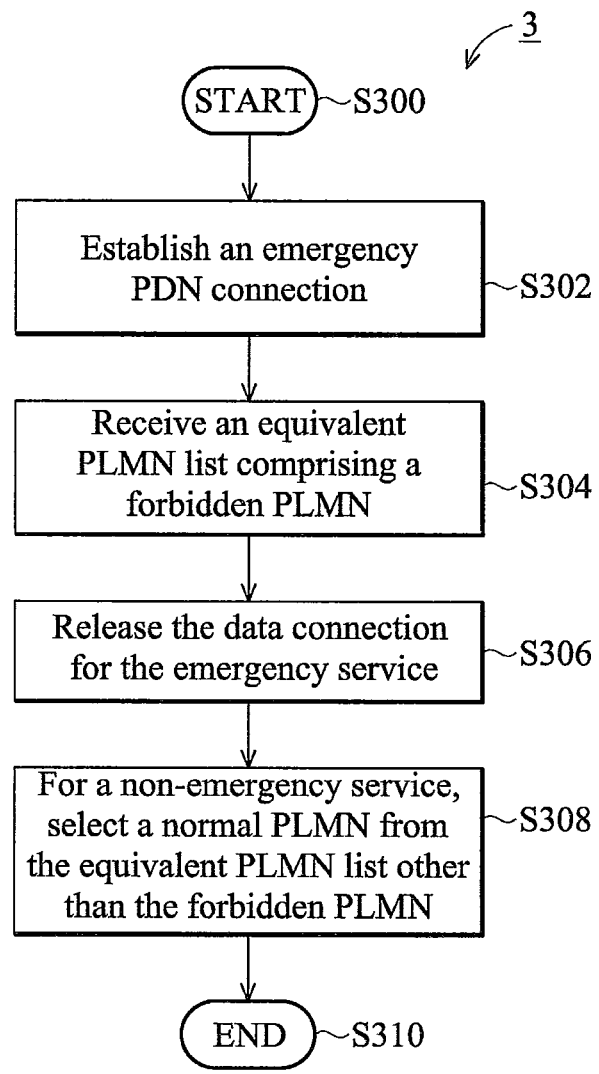
FIG. 3 is a flowchart of another exemplary PLMN selection method 3 according to the invention.

FIG. 3 is a flowchart of another exemplary PLMN selection method 3 according to the invention, incorporating the mobile communication device 110 in FIG. 1. Steps S300-S306 are identical to Steps S200-206 in the PLMN selection method 2, and will not be described again for brevity. In Step S310, in a case when requesting a non-emergency service, the controller module 112 selects a normal PLMN ID from the equivalent PLMN list other than any member in the forbidden PLMN list. In some implementations, the controller module 112 chooses a PLMN ID from the equivalent list, compares the chosen ID with the list in the forbidden list, and only requests for PLMN registration when the chosen PLMN ID is not on the forbidden list. In one embodiment, the controller module 112 selects the normal PLMN for the non-emergency service right after the emergency service. In another embodiment, the controller module 112 selects the normal PLMN for the non-emergency service when the mobile communication device 110 is powered-on.

The present invention offers another PLMN selection method for a mobile communication device that select a PLMN ID from the equivalent list other than the forbidden IDs after the emergency service has been completed, preventing the mobile communication device from requesting for an invalid PLMN registration for a non-emergency service, thereby increasing the selection efficiency and decreasing the delay for providing communication services.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, modules, and circuits described herein may be implemented in circuit hardware or embedded software codes that can be accessed and executed by a processor.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for handling an equivalent PLMN list, performed by a mobile communication device having a packet data connection with a service network for an emergency bearer service and storing a forbidden PLMN identity, the method comprising steps of:

receiving an equivalent PLMN list comprising the forbidden PLMN identity from the service network; and removing the forbidden PLMN identity from the equivalent PLMN list after the emergency bearer service has been completed.

2. The method of claim 1, further comprising:

releasing the packet data connection from the service network;

wherein the removing step comprises removing the forbidden PLMN identity from the equivalent PLMN list after the packet data connection has been released.

3. The method of claim 1, wherein the removing step comprises removing the forbidden PLMN identity from the equivalent PLMN list when the mobile communication device is switched off.

4. The method of claim 1, wherein the removing step comprises removing the forbidden PLMN identity from the equivalent PLMN list when the mobile communication device is powered on.

5. The method of claim 1, wherein the removing step is executed before a PLMN selection procedure takes place.

6. The method of claim 1, wherein the receiving step comprises receiving the equivalent PLMN list from an ATTACH ACCEPT message or a ROUTING AREA UPDATE ACCEPT message.

7. A PLMN selection method, performed by a mobile communication device having a packet data connection with a service network for an emergency bearer service and storing a forbidden PLMN identity, the PLMN selection method comprising steps of:

receiving an equivalent PLMN list comprising the forbidden PLMN identity from the service network; and being forbidden to select the forbidden PLMN identity from the equivalent PLMN list after the emergency bearer service has been completed.

8. The PLMN selection method of claim 7, further comprising:

releasing the packet data connection from the service network;

wherein the mobile communication device is forbidden to select the forbidden PLMN identity from the equivalent PLMN list after the packet data connection has been released.

9. The PLMN selection method of claim 7, wherein the mobile communication device is forbidden to select the forbidden PLMN identity from the equivalent PLMN list when the mobile communication device is powered on.

10. The PLMN selection method of claim 7, further comprising selecting a normal PLMN identity from the equivalent PLMN list.

11. The PLMN selection method of claim 7, wherein the receiving step comprises receiving the equivalent PLMN list from an ATTACH ACCEPT message or a ROUTING AREA UPDATE ACCEPT message.

12. A mobile communication device having a packet data connection with a service network for an emergency bearer service, the mobile communication device comprising:

a memory, storing a forbidden PLMN identity;

a wireless module, receiving an equivalent PLMN list from the service network; and a controller module, removing the forbidden PLMN identity from the equivalent PLMN list after the emergency bearer service has been completed.

13. The mobile communication device of claim 12, wherein the wireless module further transmits a deactivation message to the service network to release the packet data connection, and the controller module removes the forbidden PLMN identity from the equivalent PLMN list after the packet data connection has been released.

14. The mobile communication device of claim 12, wherein the controller module removes the forbidden PLMN identity from the equivalent PLMN list when the mobile communication device is switched off.

15. The mobile communication device of claim 12, wherein the controller module removes the forbidden PLMN identity from the equivalent PLMN list when the mobile communication device is powered on.

16. The mobile communication device of claim 12, wherein the controller module removes the forbidden PLMN identity from the equivalent PLMN list before a PLMN selection procedure takes place.

17. A mobile communication device having a packet data connection with a service network for an emergency bearer service, the mobile communication device comprising:

a memory, storing a forbidden PLMN identity;

a wireless module, receiving an equivalent PLMN list from the service network; and a controller module, being forbidden to select the forbidden PLMN identity from the equivalent PLMN list after the emergency bearer service has been completed.

18. The mobile communication device of claim 17, wherein the wireless module further transmits a deactivation message to the service network to release the packet data connection, and the controller module is forbidden to select the forbidden PLMN identity from the equivalent PLMN list after the packet data connection has been released.

19. The mobile communication device of claim 17, wherein the controller module is forbidden to select the forbidden PLMN identity from the equivalent PLMN list when the mobile communication device is powered on.

20. The mobile communication device of claim 17, wherein the controller module selects a normal PLMN identity from the equivalent PLMN list.

* * * * *